(12) United States Patent
Ceurvels

(10) Patent No.: US 8,656,617 B2
(45) Date of Patent: Feb. 25, 2014

(54) TRADESHOW DISPLAY SYSTEM

(75) Inventor: Scott Michael Ceurvels, Plymouth, MA (US)

(73) Assignee: Nexxtshow Exposition Services LLC, Cincinnati, OH (US)

( * ) Notice: Subject to any disclaimer, the term of this patent is extended or adjusted under 35 U.S.C. 154(b) by 0 days.

(21) Appl. No.: 13/590,468

(22) Filed: Aug. 21, 2012

(65) Prior Publication Data
US 2012/0311902 A1 Dec. 13, 2012

Related U.S. Application Data

(63) Continuation of application No. 13/563,425, filed on Jul. 31, 2012.

(51) Int. Cl.
G09F 15/00 (2006.01)

(52) U.S. Cl.
USPC ....... 40/610; 40/607.02; 40/611.01; 160/113; 160/135; 160/351

(58) Field of Classification Search
USPC ...................... 40/610, 607.02, 607.1, 611.01; 160/113, 135, 181, 182, 351
See application file for complete search history.

(56) References Cited

U.S. PATENT DOCUMENTS

| 1,483,067 A | * | 2/1924 | Berry | 40/581 |
|---|---|---|---|---|
| 1,706,388 A | * | 3/1929 | Ashkenas | 160/135 |
| 1,934,532 A | * | 11/1933 | Hallowell et al. | 40/611.04 |
| 2,145,030 A | | 1/1939 | Press | |
| 2,454,648 A | * | 11/1948 | Green | 40/602 |
| 3,189,140 A | | 6/1965 | Luss | |
| 3,370,389 A | | 2/1968 | Macaluso | |
| 3,486,287 A | | 12/1969 | Guillon | |
| 3,490,800 A | | 1/1970 | Wissler | |
| 3,513,606 A | | 5/1970 | Jones | |
| 3,733,759 A | | 5/1973 | Schulte et al. | |
| 3,987,836 A | * | 10/1976 | LeMay | 160/135 |
| 3,995,402 A | | 12/1976 | Parenteau | |
| 4,209,927 A | * | 7/1980 | Donatelle | 40/607.02 |
| 4,373,570 A | * | 2/1983 | Nussdorf et al. | 160/352 |
| 4,458,461 A | | 7/1984 | Holley | |
| 4,545,142 A | | 10/1985 | Whisnant | |
| 4,594,829 A | * | 6/1986 | Herrgord | 52/282.3 |
| 4,778,487 A | | 10/1988 | Chenel | |
| 4,905,428 A | | 3/1990 | Sykes | |
| 4,928,465 A | | 5/1990 | Del Castillo Von Haucke | |
| 4,942,713 A | | 7/1990 | Jackson | |
| 4,981,002 A | | 1/1991 | Cederholm | |
| 5,067,294 A | | 11/1991 | McGowan | |
| 5,069,263 A | | 12/1991 | Edwards | |
| 5,259,164 A | | 11/1993 | Wiese | |
| 5,291,700 A | | 3/1994 | Chew | |
| 5,474,501 A | | 12/1995 | Teng | |
| 5,515,900 A | | 5/1996 | West et al. | |

(Continued)

OTHER PUBLICATIONS

U.S. Appl. No. 13/590,714, Non Final Office Action mailed Apr. 26, 2013, 15 pages.

(Continued)

Primary Examiner — Gary Hoge
(74) Attorney, Agent, or Firm — Strategic Patents, P.C.

(57) ABSTRACT

A variety of configurations are disclosed for modular tradeshow display systems that can be assembled without the use of tools or other specialized machinery.

18 Claims, 13 Drawing Sheets

(56) References Cited

U.S. PATENT DOCUMENTS

| | | | |
|---|---|---|---|
| 5,531,539 A * | 7/1996 | Crawford | 403/381 |
| 5,537,766 A * | 7/1996 | Nickens et al. | 40/605 |
| 5,570,971 A | 11/1996 | Rixen et al. | |
| 5,634,300 A | 6/1997 | Huebner et al. | |
| 6,216,397 B1 | 4/2001 | Chang | |
| 6,467,635 B1 * | 10/2002 | McComb et al. | 211/85.16 |
| 6,493,995 B2 | 12/2002 | McKenzie | |
| 6,494,247 B1 * | 12/2002 | Pedone | 160/135 |
| 6,536,147 B1 * | 3/2003 | Funk et al. | 40/605 |
| 6,553,724 B1 | 4/2003 | Bigler | |
| 6,712,118 B2 | 3/2004 | Nussdorf | |
| 6,718,669 B1 | 4/2004 | Hayes | |
| 6,830,236 B2 | 12/2004 | Augusto de Lorenzo | |
| 7,454,867 B2 | 11/2008 | Nicoletti | |
| 7,762,023 B2 | 7/2010 | Kasdorf et al. | |
| 2002/0023391 A1 * | 2/2002 | Nymark | 52/36.4 |
| 2006/0230990 A1 * | 10/2006 | Buckner | 108/90 |
| 2008/0277639 A1 | 11/2008 | Huang | |
| 2012/0304515 A1 | 12/2012 | Ceurvels | |
| 2012/0311903 A1 | 12/2012 | Ceurvels | |
| 2012/0318764 A1 | 12/2012 | Ceurvels | |

OTHER PUBLICATIONS

U.S. Appl. No. 13/590,573 Notice of Publication, Dec. 20, 2012, 1 page.
U.S. Appl. No. 13/590,714 Notice of Publication, Dec. 13, 2012, 1 page.
U.S. Appl. No. 13/563,425, Non Final Office Action mailed Jun. 21, 2013, 23 pages.
U.S. Appl. No. 13/590,573, Non Final Office Action mailed May 31, 2013, 16 pages.
U.S. Appl. No. 13/590,714, Notice of Allowance mailed Jun. 7, 2013, 8 pages.
U.S. Appl. No. 13/563,425, Notice of Allowance mailed Sep. 4, 2013, 7 pages.

* cited by examiner

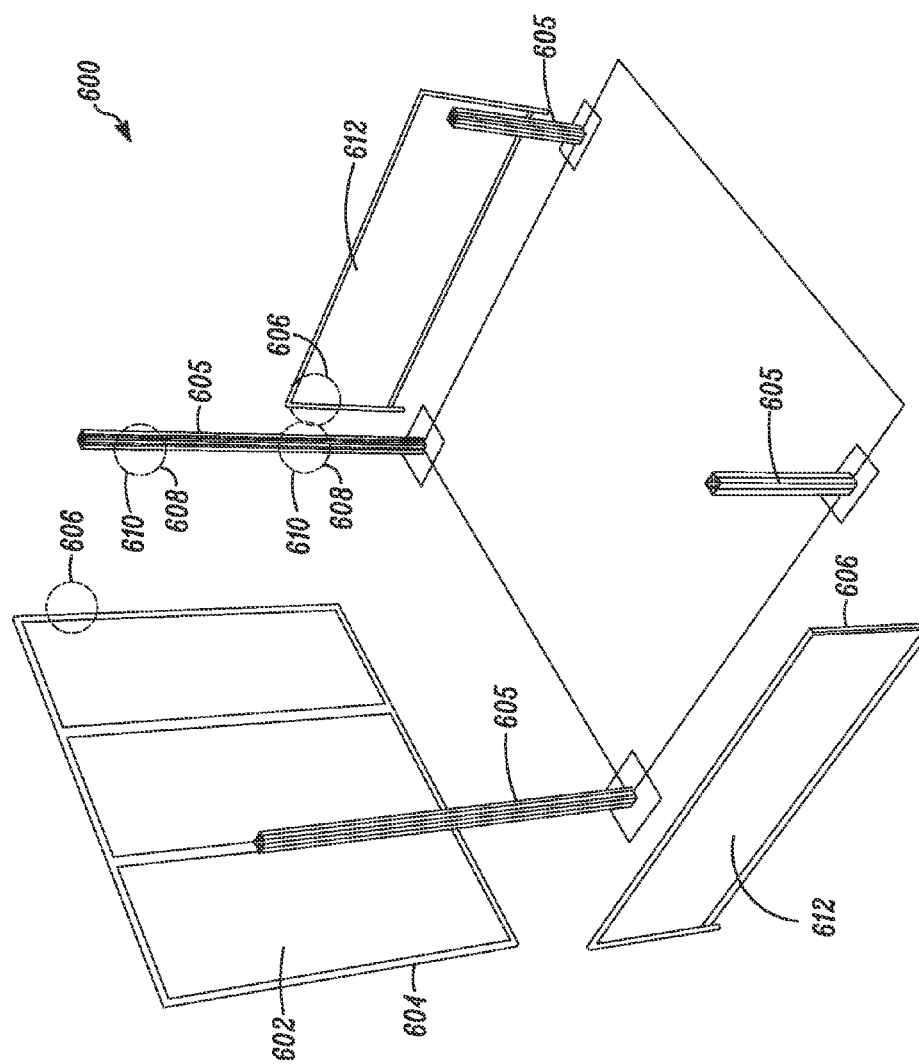

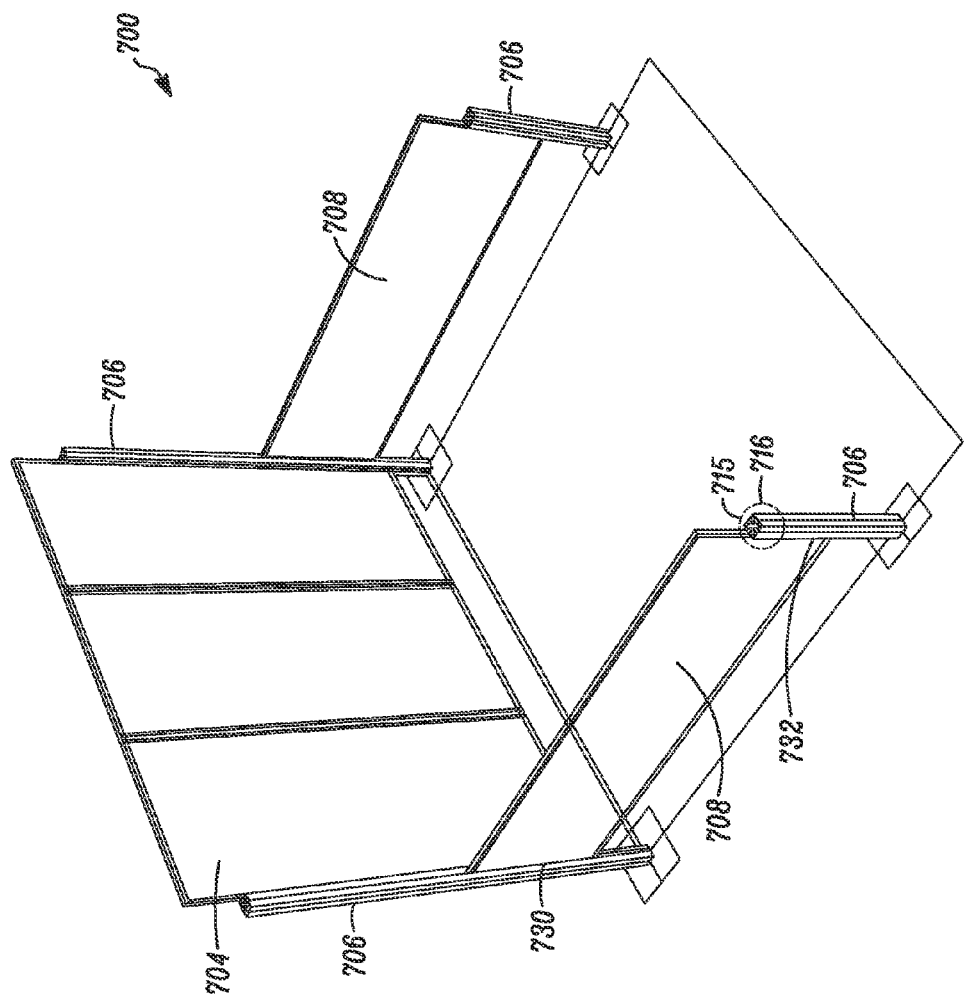

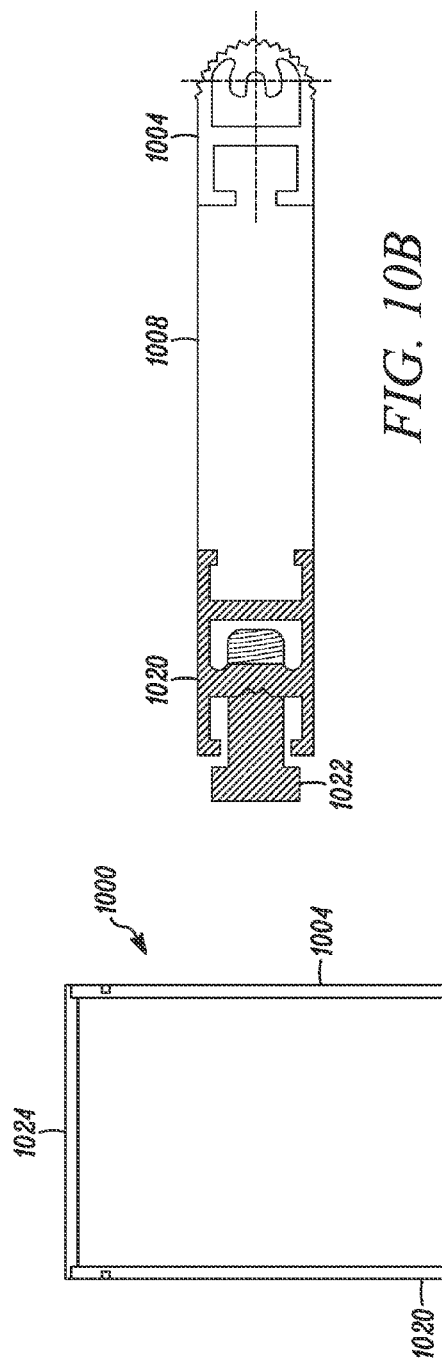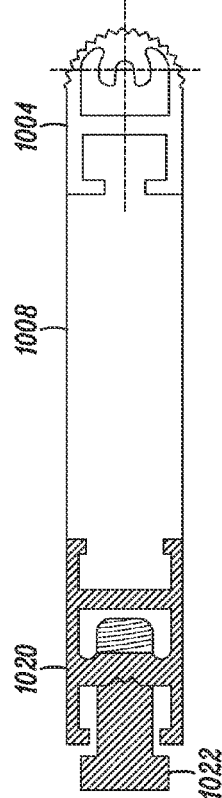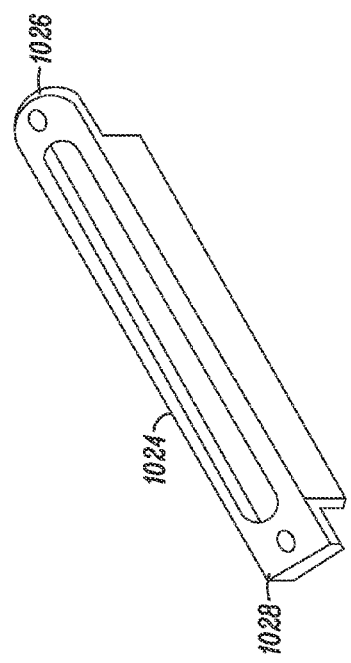

TRADESHOW DISPLAY SYSTEM

RELATED APPLICATION INFORMATION

This application is a continuation of U.S. application Ser. No. 13/563,425 filed Jul. 31, 2012, which is incorporated herein by reference in its entirety.

FIELD OF TECHNOLOGY

The present disclosure relates to tradeshow displays and more specifically to tradeshow displays that can be assembled without tools.

BACKGROUND

There remains a need for tradeshow display systems that are portable and easy to assemble/disassemble. The present invention simplifies the assembly of tradeshow display systems and eliminates the need for tools.

SUMMARY OF THE INVENTION

A variety of configurations are disclosed for modular tradeshow display systems that can be assembled without the use of tools or other specialized machinery.

In one aspect, disclosed herein is a tradeshow display. The tradeshow display may include a first vertical member and a second vertical member each formed of extruded aluminium and secured at a bottom end by a weighted base. The vertical members each include at least one channel extending vertically along the length. In some aspects, the vertical members include multiple sides, for instance four, six or eight sides and each side may have at least one opening. The channel may include a pair of opposing flanges that partially enclose an opening formed by the channel. In some aspects, the opening point may have parallel sides and semi-circular openings. In other aspects, the opening may be formed by the channel has a rounded bottom to urge attachment heads into the channel. The opposing flanges are equally spaced apart throughout the length of the vertical member, except in at least one intermediate location between the bottom end and a top end and nearer to the top end than the bottom end where a space between the pair of opposing flanges widens to form an opening. Each opening on the vertical members will have a corresponding opening at substantially an equal height to the opening on a corresponding vertical member when the vertical members are used on a substantially horizontal surface. The display may further include a display panel supported by a rigid frame. The rigid frame may further include attachment heads extending horizontally from both sides of the rigid frame. Each attachment head includes a head and a shaft. The head has a diameter greater than the channel width as determined by the distance between the opposing flanges and less than the opening between the pair of opposing flanges of the vertical members. The shaft has a diameter less than the first distance between the pair of opposing flanges of the vertical members. In some aspects, the attachment head may be any type of bolt; including a shoulder bolt. In some embodiments, when the attachment heads are positioned in the openings of the corresponding first vertical member and second vertical member and the vertical members are placed on a horizontal surface the panel can be moved downward under gravity to a position where the first attachment head and the second attachment head are secured within the pair of opposing flanges of each of the vertical members. In this embodiment, once positioned the vertical members and the rigid display panel thereby provides a rigid vertical display structure containing the display material.

In another aspect, the display material used in the tradeshow display may be manufactured from corrugated paper, corrugated plastic, cloth, acrylic, cast acrylic, extruded acrylic, any combination thereof or any other material appropriate for the display. In another aspect, the top of the rigid frame may include an opening to removably replaceably receive the display material. In another aspect, the display material may include two layers, a first layer, which provides a rigid support within the frame and a second layer providing a removable and replaceable graphic for display within the rigid frame.

In another aspect, the rigid frame that supports the display material may be formed from extruded aluminum members. In another aspect, the display panel can be configured to form a three-dimensional display. In another aspect, the attachment head may include a bolt. In another aspect the opening on the vertical member may have parallel sides and semicircular ends. In another aspect, the opening may be formed by the channel has a rounded bottom to urge the attachment heads into the channel. In another aspect, the vertical members may have a plurality of channels. In another aspect, each vertical member may have a plurality of sides and one channel and at least one opening corresponding to each side of the vertical member. In another aspect, the vertical member may be rectangular and have one channel and at least one opening corresponding to each side. In another aspect, each vertical member may be hexagonal and have one channel and at least one opening corresponding to each side. In another aspect, each vertical member may be octagonal and have one channel and at least one opening corresponding to each side. In another aspect, a plurality of rigid frames may be interconnected by a plurality of vertical members and arranged into a three-dimensional display. In another aspect, the plurality of rigid frames may be arranged onto a rectangular footprint. In another aspect, each vertical member will have at least two openings. In a further aspect, a system for tool-free assembly of a multi-part tradeshow display wherein the rigid frame of the display has only two attachment points which are connected to vertical members and is held in place by gravity is disclosed. The system may include a pair of vertical members each with a channel of a first width with retaining flanges of a second width less than the first width. The system may further include a display panel surrounded by a rigid frame and an attachment mechanism consisting of an attachment head on one side of the rigid frame and another attachment head on the second side of the rigid frame. In some embodiments, the attachment heads each have a head with a diameter between the first width and the second width of the channel and a shaft having a diameter less than the second width of the channel.

In another aspect of the tool-free assembly, the display material used in the tradeshow display may be manufactured from corrugated paper, corrugated plastic, cloth, acrylic, cast acrylic, extruded acrylic, any combination thereof or any other material appropriate for the display. In another aspect, the top of the rigid frame may include an opening to removably replaceably receive the display material. In another aspect, the display material may include two layers, a first layer, which provides a rigid support within the frame and a second layer providing a removable and replaceable graphic for display within the rigid frame. In another aspect, the rigid frame that supports the display material may be formed from extruded aluminum members. In another aspect, the display panel can be configured to form a three-dimensional display.

In another aspect, the attachment head may include a bolt. In another aspect the opening on the vertical member may have parallel sides and semicircular ends. In another aspect, the opening may be formed by the channel has a rounded bottom to urge the attachment heads into the channel. In another aspect, the vertical members may have a plurality of channels. In another aspect, each vertical member may have a plurality of sides and one channel and at least one opening corresponding to each side of the vertical member. In another aspect, the vertical member may be rectangular and have one channel and at least one opening corresponding to each side. In another aspect, each vertical member may be hexagonal and have one channel and at least one opening corresponding to each side. In another aspect, each vertical member may be octagonal and have one channel and at least one opening corresponding to each side. In another aspect, a plurality of rigid frames may be interconnected by a plurality of vertical members and arranged into a three-dimensional display. In another aspect, the plurality of rigid frames may be arranged onto a rectangular footprint. In another aspect, each vertical member will have at least two openings.

In a further aspect, the invention may be a system for tool-free assembly of a multi-part tradeshow display, which permits rotation of the display about the connection points. The system may include a pair of vertical members each having a weighted base and a vertical channel with a retaining flange and a display surrounded by a rigid frame. The rigid frame may include a pair of attachment heads retained at a pair of connection points, a left connection point and a right connection point, within the vertical channels of the vertical members by the retaining flanges.

In another aspect of the tool-free assembly, the display material used in the tradeshow display may be manufactured from corrugated paper, corrugated plastic, cloth, acrylic, cast acrylic, extruded acrylic, any combination thereof or any other material appropriate for the display. In another aspect, the top of the rigid frame may include an opening to removably replaceably receive the display material. In another aspect, the display material may include two layers, a first layer, which provides a rigid support within the frame and a second layer providing a removable and replaceable graphic for display within the rigid frame. In another aspect, the rigid frame that supports the display material may be formed from extruded aluminum members. In another aspect, the display panel can be configured to form a three-dimensional display. In another aspect, the attachment head may include a bolt. In another aspect the opening on the vertical member may have parallel sides and semicircular ends. In another aspect, the opening may be formed by the channel has a rounded bottom to urge the attachment heads into the channel. In another aspect, the vertical members may have a plurality of channels. In another aspect, each vertical member may have a plurality of sides and one channel and at least one opening corresponding to each side of the vertical member. In another aspect, the vertical member may be rectangular and have one channel and at least one opening corresponding to each side. In another aspect, each vertical member may be hexagonal and have one channel and at least one opening corresponding to each side. In another aspect, each vertical member may be octagonal and have one channel and at least one opening corresponding to each side. In another aspect, a plurality of rigid frames may be interconnected by a plurality of vertical members and arranged into a three-dimensional display. In another aspect, the plurality of rigid frames may be arranged onto a rectangular footprint. In another aspect, each vertical member will have at least two openings.

In a further aspect, the apparatus may be a system for tool-free assembly of a multi-part tradeshow display where the assembled tradeshow display achieves structural stability using its own weight. The system may include a pair of vertical members each having a weighted base and a vertical channel with a retaining flange and a point where the retaining flanges widen to receive an object into the vertical channel, a display surrounded by a rigid frame, and a pair of attachment heads on a left side and a right side of the rigid frame. The attachment points are retained at a respective pair of connection points within the vertical channels of the vertical members away from the insertion point by the retaining flanges when the pair of vertical members and the display are positioned for use on a substantially horizontal surface. The attachment heads permit rotation about the connection points and the retaining flanges limit translational movement of the connection points to a path along the vertical channel and the pair of attachment heads are positioned on a top half of the rigid frame and the insertion point is at a different height than the pair of attachment heads when the pair of vertical members and the display are positioned for use. The rigid frame is retained from downward movement by the substantially horizontal surface and retained in a vertical orientation by the vertical channels and the retaining flanges of the pair of vertical members.

In another aspect of the tool-free assembly, the display material used in the tradeshow display may be manufactured from corrugated paper, corrugated plastic, cloth, acrylic, cast acrylic, extruded acrylic, any combination thereof or any other material appropriate for the display. In another aspect, the top of the rigid frame may include an opening to removably replaceably receive the display material. In another aspect, the display material may include two layers, a first layer, which provides a rigid support within the frame and a second layer providing a removable and replaceable graphic for display within the rigid frame. In another aspect, the rigid frame that supports the display material may be formed from extruded aluminum members. In another aspect, the display panel can be configured to form a three-dimensional display. In another aspect, the attachment head may include a bolt. In another aspect the opening on the vertical member may have parallel sides and semicircular ends. In another aspect, the opening may be formed by the channel has a rounded bottom to urge the attachment heads into the channel. In another aspect, the vertical members may have a plurality of channels. In another aspect, each vertical member may have a plurality of sides and one channel and at least one opening corresponding to each side of the vertical member. In another aspect, the vertical member may be rectangular and have one channel and at least one opening corresponding to each side. In another aspect, each vertical member may be hexagonal and have one channel and at least one opening corresponding to each side. In another aspect, each vertical member may be octagonal and have one channel and at least one opening corresponding to each side. In another aspect, a plurality of rigid frames may be interconnected by a plurality of vertical members and arranged into a three-dimensional display. In another aspect, the plurality of rigid frames may be arranged onto a rectangular footprint. In another aspect, each vertical member will have at least two openings.

In a further aspect, the apparatus may be a system for tool-free assembly of a multi-part tradeshow display with a pair of vertical members each having a weighted base and a vertical channel with a retaining flange and at least one insertion point with an opening where the retaining flanges widen to receive an object into the vertical channel. The assembly further includes a display surrounded by a rigid frame. The assembly further includes a pair of attachment heads on a left side and a right side of the rigid frame, the pair of attachment points retained at a respective pair of connection points within the vertical channels of the vertical members away from the insertion point by the retaining flanges when the pair of vertical members and the display are positioned for use on a substantially horizontal surface. Wherein the attachment heads permit rotation about the connection points and the retaining flanges limit translational movement of the connection points to a path along the vertical channel, and wherein the pair of attachment heads are positioned on a top half of the rigid frame and each insertion point is at a different height than the pair of attachment heads when the pair of vertical members and the display are positioned for use, whereby the rigid frame is retained from downward movement by the substantially horizontal surface and retained in a vertical orientation by the vertical channels and the retaining flanges of the pair of vertical members.

In another aspect of the tool-free assembly, the display material used in the tradeshow display may be manufactured from corrugated paper, corrugated plastic, cloth, acrylic, cast acrylic, extruded acrylic, any combination thereof or any other material appropriate for the display. In another aspect, the top of the rigid frame may include an opening to removably replaceably receive the display material. In another aspect, the display material may include two layers, a first layer, which provides a rigid support within the frame and a second layer providing a removable and replaceable graphic for display within the rigid frame. In another aspect, the rigid frame that supports the display material may be formed from extruded aluminum members. In another aspect, the display panel can be configured to form a three-dimensional display. In another aspect, the attachment head may include a bolt. In another aspect the opening on the vertical member may have parallel sides and semicircular ends. In another aspect, the opening may be formed by the channel has a rounded bottom to urge the attachment heads into the channel. In another aspect, the vertical members may have a plurality of channels. In another aspect, each vertical member may have a plurality of sides and one channel and at least one opening corresponding to each side of the vertical member. In another aspect, the vertical member may be rectangular and have one channel and at least one opening corresponding to each side. In another aspect, each vertical member may be hexagonal and have one channel and at least one opening corresponding to each side. In another aspect, each vertical member may be octagonal and have one channel and at least one opening corresponding to each side. In another aspect, a plurality of rigid frames may be interconnected by a plurality of vertical members and arranged into a three-dimensional display. In another aspect, the plurality of rigid frames may be arranged onto a rectangular footprint. In another aspect, each vertical member will have at least two openings.

DESCRIPTION OF THE DRAWINGS

The foregoing and other objects and advantages of the invention will be appreciated more fully from the following further description thereof, with reference to the accompanying drawings. The drawings are not necessarily to scale, with emphasis instead being on the inventive aspects of this disclosure. In the following drawings, like numbers are used to refer to like elements:

FIG. 6 depicts a partially assembled tradeshow display with the display panel fully expanded;

FIG. 7 depicts a partially assembled tradeshow display with the display panel partially expanded and joined with the vertical members;

FIGS. 10A-10C depict a left side frame assembly of the display panel; and

DETAILED DESCRIPTION

To provide an overall understanding of the invention, certain illustrative embodiments will now be described, including tradeshow displays with various tools-free assembly mechanisms. However, it will be understood that the methods and systems described herein can be suitably adapted to any tradeshow display or other context where temporary and/or portable display systems might be usefully deployed. These and other applications of the systems described herein are intended to fall within the scope of the invention.

Figure 1:
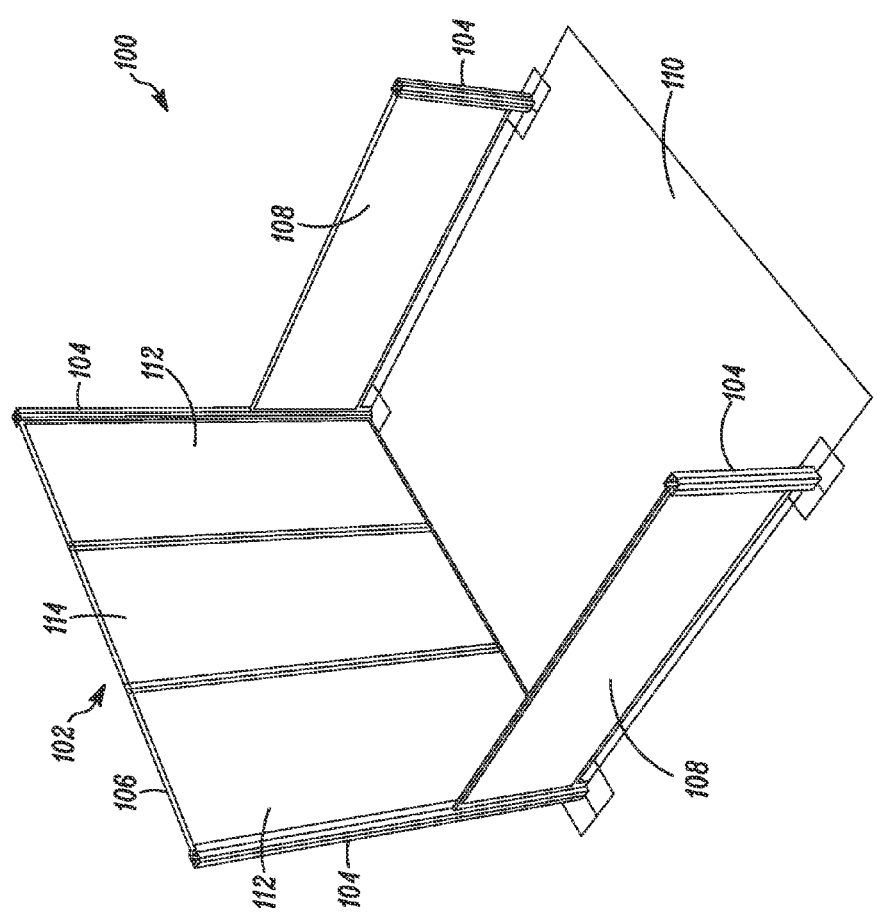
FIG. 1 depicts a fully assembled tradeshow display with the display panel fully expanded and joined with the vertical members.

FIG. 1 depicts a fully assembled tradeshow display 100 with the display panel 102 fully expanded and attached to vertical members 104. The display panel 102 may be placed within a frame 106. In one embodiment, the tradeshow display 100 further includes side panels 108. The side panels 108 are also joined to the vertical members 104. The vertical members 104 are assembled on a base assembly 110. As shown in this embodiment, the display panel 102 may be comprised of two side panels 112 and one center panel 114. In other embodiments, multiple center panels 114 may be used to either expand the width of the tradeshow display 100 or create a perception of depth by the use of rotating hinges 804 (described in greater detail in FIGS. 8A-8C) to angle the display panels 102.

Figure 2:
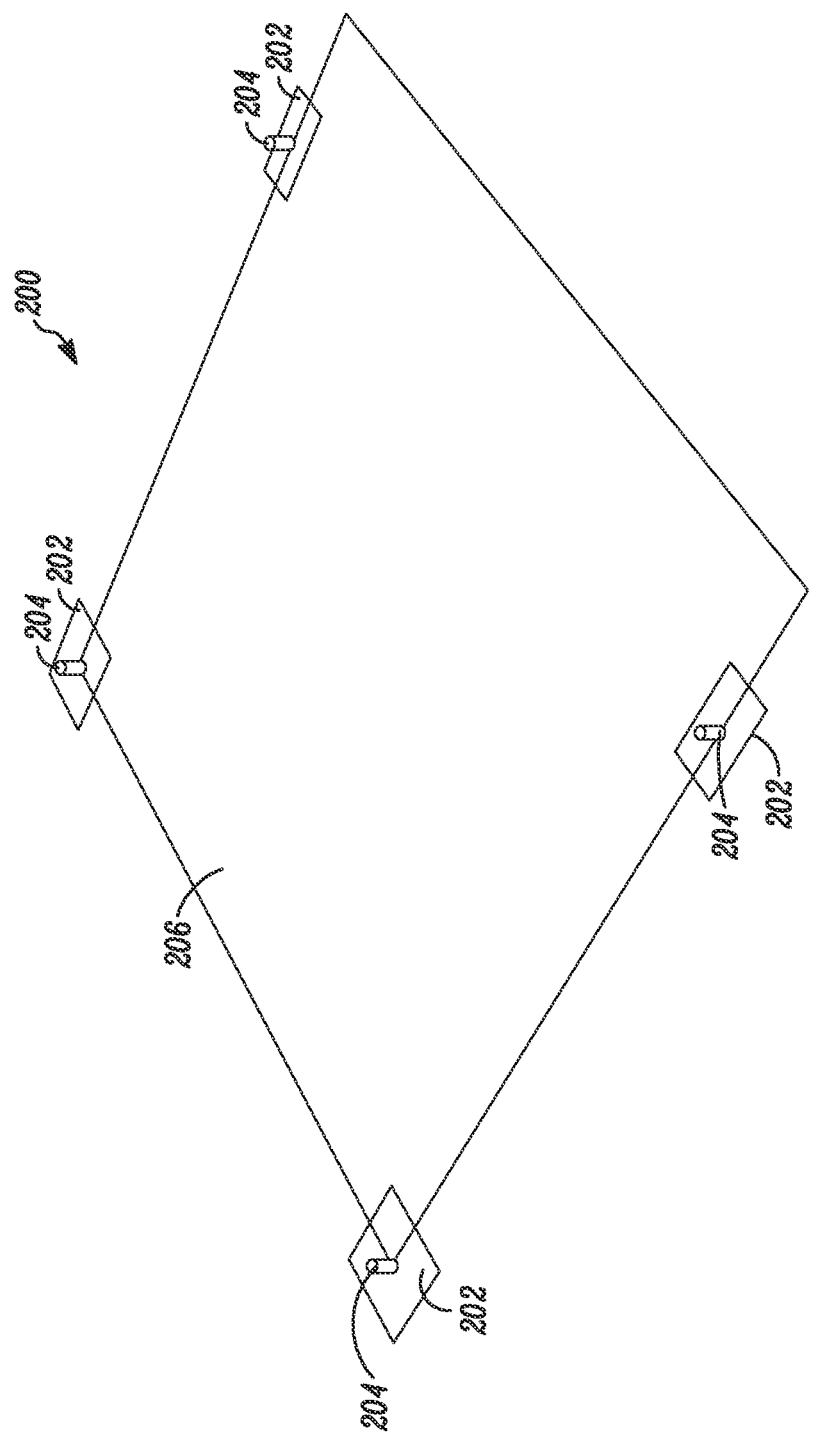
FIG. 2 depicts a base plate for the tradeshow display.

Each panel 108, 112, 114 may include any suitable graphics for an intended use such as company logos, contextual photographs, drawings, informational materials, artwork, and so forth. The graphics may be painted or printed on to the panels 108, 112, 114, or applied as a laminate with adhesive. In other embodiments, the graphics may be provided as a separate sheet of plastic or other material that can slide into the frame 106 between the vertical members 104 so that each graphic can be readily removed and replaced to afford re-use of the tradeshow display 100 for different vendors, or for the same vendor in different contexts. As described in greater detail below, each panel frame may include an open slot in a top thereof to removably and replaceably receive display materials FIG. 2 depicts a base assembly 200 for the tradeshow display. The base assembly 200 may include at least two base plates 202. The base plates 202 may be sufficiently weighted to support a vertical member (not shown in this view). Each base plate 202 may further include a peg 204 fixed to the base plate 202. The peg 204 may be a simple peg inserted into a corresponding hole in a vertical member 104 and may be of sufficient length to attach and prevent the vertical member 104 from slipping out. In other embodiments, the peg 204 may be formed to correspond with channels and flanges (not shown in this view) formed in the vertical member 104.

Further, the base assembly 200 may include a template 206 that aligns the base plates 202 at predetermined locations in order to simplify the assembly of the tradeshow display. In some embodiments, the template 206 may form a portion of the tradeshow display, and may include carpeting, hardwood or simulated hardwood panels, rubber flooring, a mat of any suitable material, or any other flooring material or the like for the display. In another aspect, the template may be a removable template printed on paper, plastic, or any other thing material that can be rolled or folded for delivery, and removed once the bases plates 202 have been positioned. The template 206 may include cut-outs shaped and sized to receive the base plates 202 in appropriate positions in order to afford easy removal of the template 206 after assembly of the display. In another aspect, the template 206 may include graphics or a color pattern corresponding to the display panels and/or an intended use of the tradeshow display.

Figure 3:
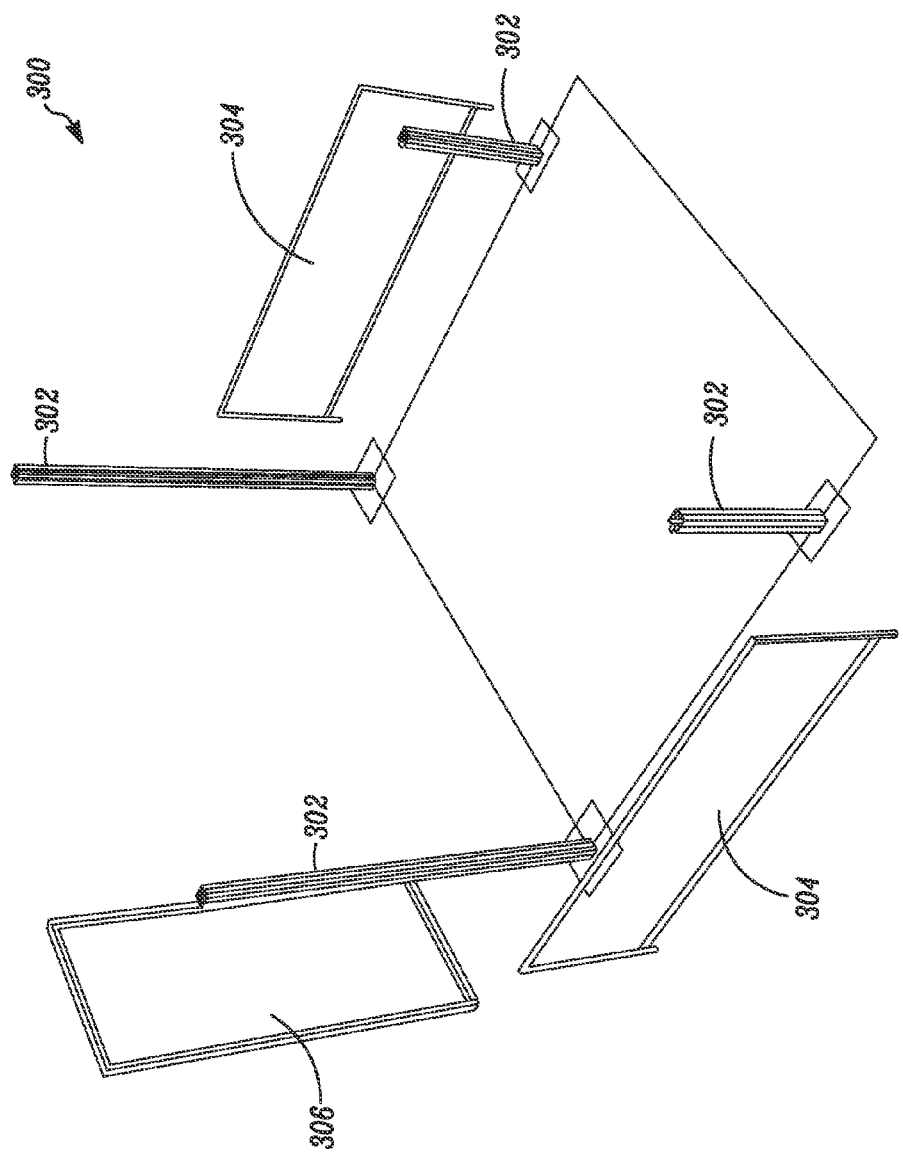
FIG. 3 is an exploded view of portions of a trade show display.

FIG. 3 is an exploded view of portions of a trade show display 300. In this view, the vertical members 302 are installed on the pegs, as discussed above. The vertical members 302 are placed on the pegs by sliding the pegs into the channel (the channel is described in more detail in FIG. 4A). In some embodiments, the vertical member 302 may be fixed to the peg by a spring loaded detent and a corresponding receiver for the detent in the vertical member 302 or the vertical member 302 may be fixed to the peg by a pin or other insert. In other embodiments, the vertical member 302 may be fixed to the peg simply by the weight of the vertical member 302. Similarly, any latching or attachment mechanism using, e.g., knobs, levers, sliders, or the like may be suitably employed. Once the vertical members 302 are fixed on the pegs the side panels 304 and the display panel 306 can be mounted to the vertical members 302. The display panel 306 is shown folded closed in a condition for shipping, and may unfold as described below in further detail to span the two rear vertical members 302 in FIG. 3.

It will be noted that the depicted tradeshow display has taller vertical members 302 in the rear thereof, thus providing a full-height back wall and lower side walls consistent with a typical tradeshow booth. However, these heights are optional, and any suitable height may be used including, e.g., full-height sidewalls for a more private enclosure, or a lower-height back wall to permit display of a product or other items behind the back wall. More generally, any arrangement and selection of heights suitable for an intended design may be accommodated with the techniques described herein.

Figure 4A:
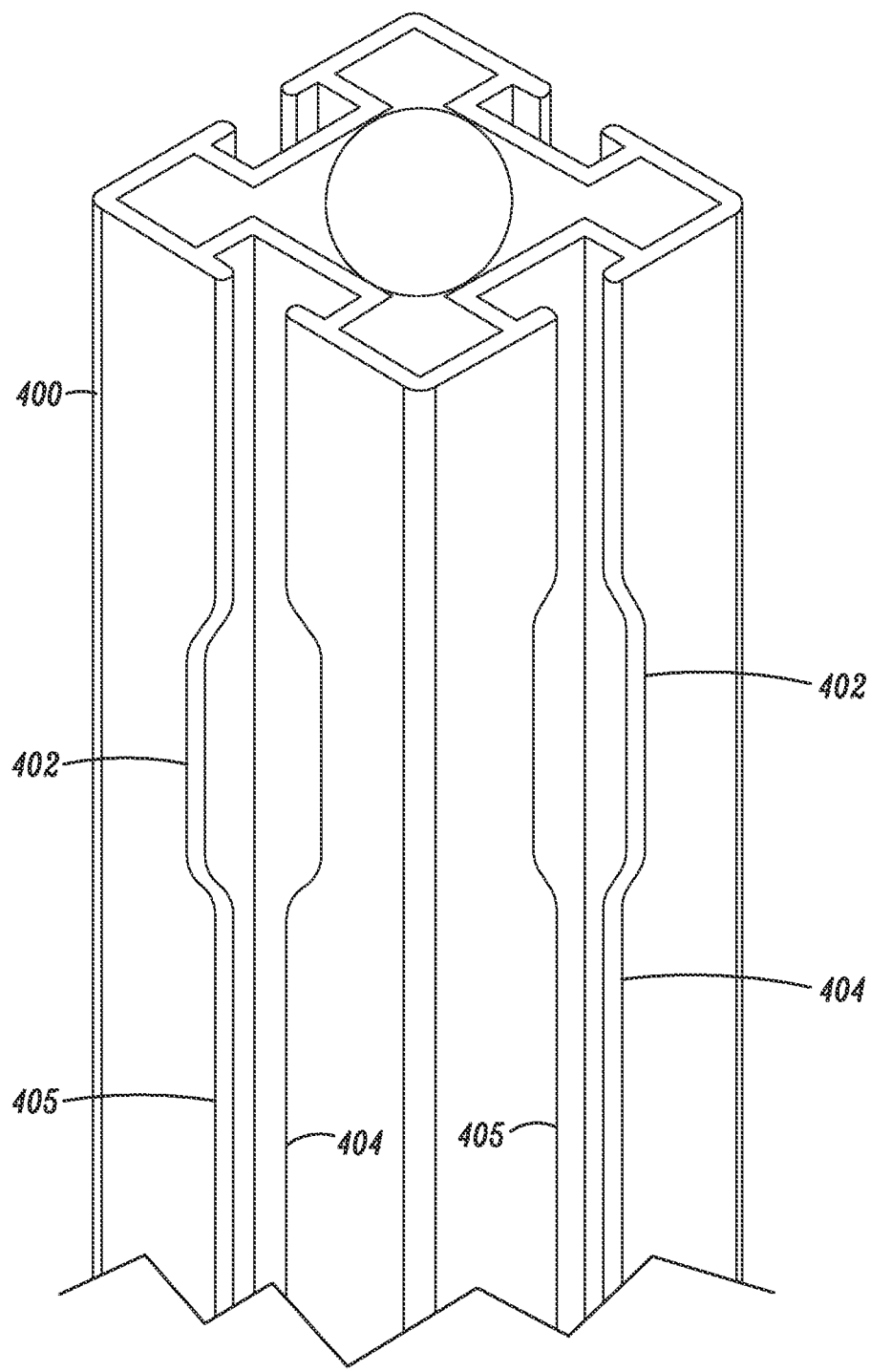
FIG. 4A depicts the opening in the flange of a vertical member.

FIG. 4A depicts an opening 402 in the flanges 404 of a vertical member 400. In some embodiments, an attachment head (one embodiment shown in FIG. 4C) may be placed within the opening 402 and moved downward under gravity to a position where the attachment head is secured between the flanges 404. The opening 402 may be formed between a pair of opposing flanges 404, 405. The flanges 404, 405 may generally be a uniform distance from each other along the length of the vertical member 400. This distance may be sufficient to allow the attachment mechanism such as an attachment head to slide freely along the axis of the vertical member 400 (that is the axis along the length of the vertical member 400, which would be a vertical axis when the vertical member 400 is oriented in its upright, vertical position during use), yet sufficiently narrow so that the head of the attachment mechanism is retained within the vertical member 400 by the opposing flanges 404, 405. At a predetermined location, the distance between the flanges 404, 405 may increase to a sufficient distance to allow the head of the attachment mechanism to be either inserted into or removed from the channel along the vertical member 400.

In other embodiments, the opening 402 may be wide enough to allow the head of the attachment mechanism to be inserted into the channel, but then narrows such that the width of the attachment mechanism body is wider than the distance between flanges 404, 405 and prevent the attachment head from sliding further down. That is, the flanges 404, 405 may collapse sufficiently close to one another (or connect to one another to fully enclose the channel) moving along the vertical axis of the vertical member 400 to limit or prevent movement of the attachment mechanism beyond a predetermined axial position.

It will further be appreciated that while the opening is shown as having a generally oval shape, a variety of other shapes may also or instead be used. For example, the opening may be generally circular, or may have a wedge or triangular shape that urges the attachment mechanism into a centered position in the channel as the attachment mechanism slides within the channel and axially along the vertical member 400. In other embodiments, the opening 402 may form an "L" or inverted "7" shape so that the attachment mechanism, once secured to the vertical member cannot be moved directly upward, but must instead be moved horizontally to align with the vertical portion of the opening, after which the attachment mechanism can be moved vertically toward the portion of the opening 402 that permits the attachment mechanism to disengage from the vertical member 400.

Figure 4B:
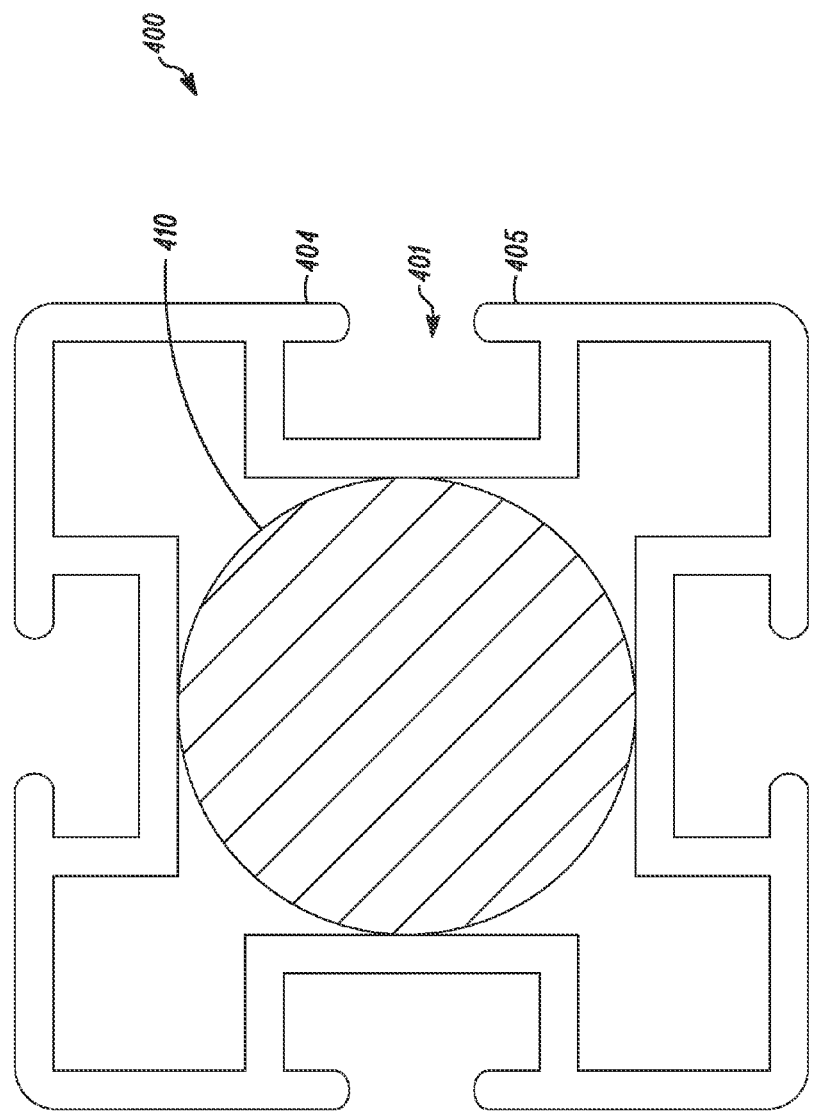
FIG. 4B depicts one possible cross section of the vertical member.

FIG. 4B depicts one possible cross section of a vertical member 400. Many possible cross section of vertical member 400 may be used to create tradeshow displays with different angles and other features. As depicted, each side of the vertical member 400 includes a channel 401 bounded by a pair of flanges 404, 405 that can slidably retain an attachment head therein. The interior of the vertical member 400 may be shaped and sized to receive a post 410 or other supporting member of a base as described above. The vertical member 400 can be formed in a variety of shapes. The shape of the vertical member 400 can be determined by the required setup of the tradeshow display. Trade show displays may be needed to fit a particular space at a show. Typically, the spaces at a show are rectangular and a square vertical member 400 may be provided with functional surfaces in a square or rectangular arrangement (as depicted in FIG. 4B) to accommodate this rectangular geometry. However, in other circumstances the space may be of an alternate shape, or a different shape of the display may be desired. For example, a space may be circular on at least one side and the display will have to closely conform to that space. In this instance, the vertical members might be shaped to have more sides than a rectangle. Potential shapes for the vertical member 400 might include a hexagon or an octagon, which afford more angles at which to join panels of the display. Similarly, a free standing sign within a display or otherwise positioned on a display floor, may be suitable formed using panels Other potential shapes can be usefully created by mixing and matching vertical members having different cross sectional shapes in order to create patterns and shapes to conform a tradeshow space or to create display that can convey the message desired by the entity using the display.

The vertical members may be manufactured through a variety of methods, including extrusion. Extrusion may generally be any process of shaping a material by forcing the material though a die with a predetermined cross section. The extrusion process can be done using either hot or cold materials. The extrusion process allows for the formation of complex cross sections including the cross section shown in FIG. 4B, octagons, hexagons, or any other shape. The shape will be determined by the desired application. Further, the extrusion process allows for the use of a variety of materials including metals, ceramics, plastics and many more. The material selected will depend on the application. Metals, including aluminium, may be used for applications that require a certain amount of shear strength, while other material such as plastics may be used for weight and/or cost saving which would allow for lower shipping costs where the strength of extruded aluminium is not required. Further, the extrusion process allows for vertical members that can be of any length necessary. As seen in FIG. 1, the vertical members 104 may be of a variety of lengths. The length, in addition to the shape, will allow for tradeshow displays of a variety of complexities from a simple rectangle with a flat background to complex shapes with a variety of heights, which could create complex three-dimensional shapes according to a desired design and layout.

Figure 4C:
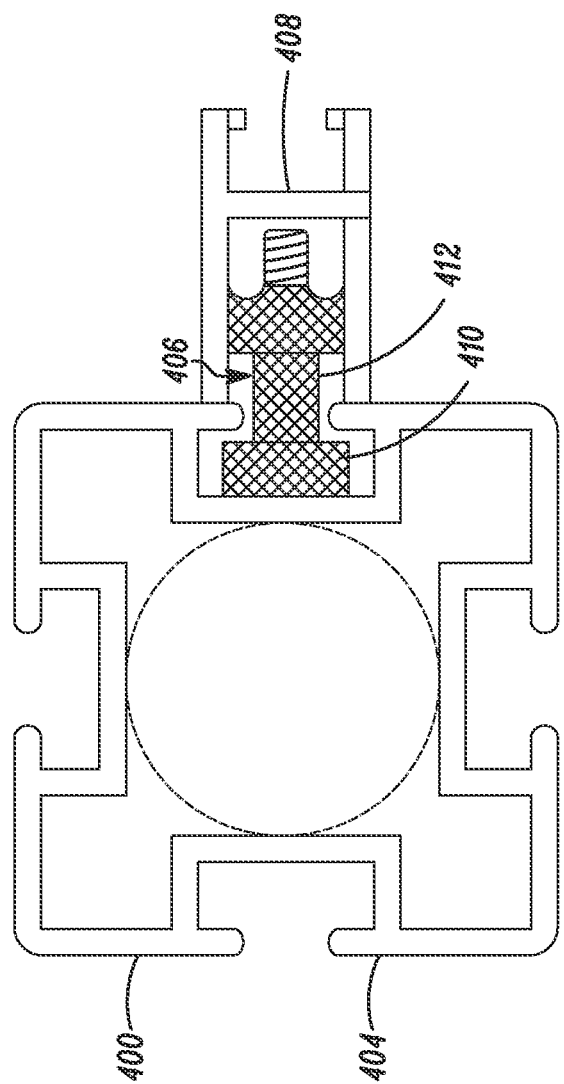
FIG. 4C depicts an attachment connected to the vertical member.

FIG. 4C depicts an attachment mechanism 406 connected to the vertical member 400. The attachment mechanism 406 may be threaded into the frame 408 of either a display panel, the frame 408 having been tapped and threaded to receive the attachment mechanism 406, a side panel, or any other panel to be connected to a vertical member 400. The attachment mechanism 406 may also or instead be threaded into a captive nut or the like retained within the frame 408.

The head 410 of the attachment mechanism 406 (also referred to herein as an attachment head 410) may be slipped into the opening (discussed in FIG. 4A) of the flange 404 of the vertical member 400. In this embodiment, the head 410 is held in place by the narrowing of the flange 404, which is narrower than the shoulder 412 of the attachment 406 at every point except at an opening.

The attachment mechanism 406 may be either permanently or removably attached to the frame 408. It should be noted that any type of bolt, or more generally any metal or other suitably strong and suitable shaped insert, may be used. In one aspect, this may be conveniently achieved with convention hardware such as a shoulder bolt having three parts. The first is the head, which is slid into the opening of the flange and prevents the display from moving laterally with respect to the display frame. The second is the shoulder, which is narrower than the opening of the flange but wider than every other point of the flange and once in place prevents the display from moving vertically with respect to the vertical member. The shoulder also assists in the assembly of the tradeshow display by determining the amount of the bolt that will be exposed beyond frame without having to measure the exposed length. The third is the thread, which is used to attach the bolt to a hole that has been tapped and threaded in the frame. It will be noted that where a bolt is threaded to a display panel, this is preferably performed prior to shipping of the parts of the display to a venue if tools-free assembly at the venue is desired.

The shape of the attachment mechanism may usefully permit rotation of the frame when joined to one or more vertical members. This allows the display to rotate about the connection point in order to angle the display as required by the final specifications of the trade show display. Thus in one aspect, the connection point is constrained to movement in two ways—first by sliding along the axis of the vertical member, and second by rotation about the connection point. In this manner, the panel may be conveniently handled and maneuvered during intermediate assembly steps, such as by permitting gripping by the sides while retained within the channel of a vertical member at the connection point.

In one aspect, one or more of the panels may be directly and permanently secured (i.e., secured against disassembly with bolts, adhesives or any other joining mechanisms) to one or more of the vertical members. This arrangement into a two-dimensional panel with vertical members attached thereto may nonetheless be conveniently stacked with other components for storage or shipping, and may usefully reduce assembly time by providing a tradeshow display that arrives at a venue partially assembled. In another aspect, one or more panels may be conveniently assembled to one or more vertical members without use of openings into retaining channels. That is, during assembly one or more of the attachment heads may be slid into one or more vertical member from an open end of the vertical member. Thus various embodiments may use different numbers of openings according to an intended assembly plan, all without departing from the scope of this disclosure.

Figure 5:
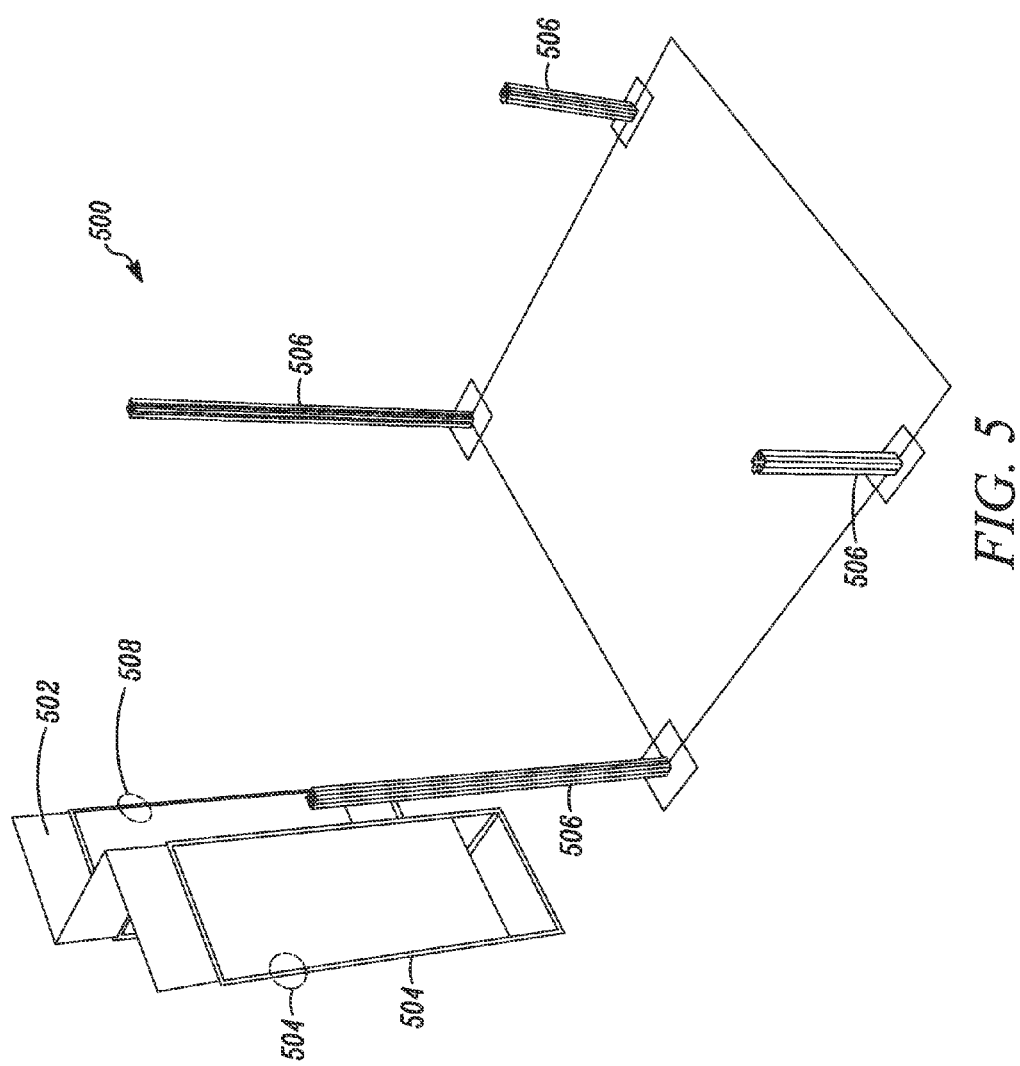
FIG. 5 depicts a tradeshow display 500 with a partially expanded folding display panel.

FIG. 5 depicts a tradeshow display 500 with a partially expanded folding display panel 502. A rigid frame 504 surrounds the display panel 502. The display panel 502 may be a single-piece panel or hinged multi-pieced panels. Each display panel 502 of the tradeshow display 100 may be made of corrugated cardboard, corrugated plastic, cast acrylic, extruded acrylic, rolled laminate, other plastic(s), cloth, canvas, or any other material or combination of materials that may be fashioned into sheets and retained within the frame 504. In the embodiment shown, the display panel 502 may be slid into the frame 504, which is then attached to vertical members 506 by attachments 508 and held in place by gravity.

In one aspect, the rear vertical members 506 may each include an opening for side panels (not shown) of the display as described above, while the front vertical members 506 may omit a machined or otherwise formed opening. Instead, the attachment for the side panels may be inserted directly into an open top of the channel in the forward vertical members 506 during assembly. While not shown, it will further be understood that a cap or other aesthetic feature may be placed into or over the open top surface of each vertical member 506 as desired.

FIG. 6 depicts a partially assembled tradeshow display 600 with the display panel 602 fully expanded. The display panel 602 supported by the frame 604 may be attached to the vertical members 605 by use of attachment mechanisms 606 such as those described above. An attachment mechanism 606 may extend horizontally from both sides of the frame 604. Each attachment mechanism 606 may have a body that has a narrower diameter than the diameter of the head of the attachment mechanism 606. For example, the attachment mechanism 606 may be a bolt. The head of the attachment mechanism 606 can be inserted into an opening 608 and slid down a channel 610. An opening 608 is located at an intermediate point along channel 610. Further, multiple openings 608 may be located along the channel 610, in order to provide for the attachment of multiple bolts. Similarly, side panels 612 are attached at both ends to the vertical members 605 using corresponding attachment mechanism 606 and opening 608. The openings 608 may be located near the same height as a corresponding attachment head of one of the panels when the vertical member and panel are placed on a horizontal surface and positioned for use (e.g., upright or vertical). In this context, the opening 608 may be somewhat higher or lower than the height of the corresponding attachment head so that the panel may be raised and, after the attachment head is inserted into the opening, lowered to a floor or other supporting surface. Conversely, the opening may be somewhat higher than the attachment head, in which case the panel may be tilted (to lower the attachment head) and, once the attachment head is inserted, straightened upright as the attachment head slides in the channel of the vertical member to a location where the attachment head is retained within the channel by the flanges of the vertical member as described above.

In some embodiments, the display panel 602, the side panel 612, and any other panels that may be used in the final display configuration chosen by the user will hang from the attachment mechanism 606 by means of gravity, such as where the flanges join together to form a bottom support for the sliding attachment head. In other embodiments, the panel(s) may slide downward until a bottom edge of the panel touches a floor or other supporting surface. In either case, a panel may be coupled to a vertical member in a manner pivotally connected to and slidably engaged within a channel, in which position the panel is retained under gravitational forces without use of tools or other couplings. In other embodiments, multiple attachment mechanisms 606 may be used to secure the panels. In other embodiments, a peg attached to the vertical member 605 may be used to prevent the display panel 602 and the side panel 612 from swinging. Similarly, weights or other supports may be used on a bottom of each panel to prevent swinging or other displacement.

Numerous variations to this basic coupling technique are possible. In one aspect, one or more of the vertical members may not include any openings in the flanges, such as where panel assemblies are loaded from a top of bottom of the vertical member(s). In another aspect, a vertical member may include more than one opening, such as where a panel assembly has two or more attachment heads on each side, or where the vertical member is designed for different panels of different heights. In another aspect, each panel may consist of a single attachment head on each of two opposing sides, or each panel may consist of a pair of attachments heads on each of two opposing sides. More generally, numerous variations are possible to the techniques described herein, and all such variations are intended to fall within the scope of this disclosure.

FIG. 7 depicts a partially partial assembled tradeshow display 700 with a folding display panel 704 fully expanded and joined with the vertical members 706. Further, it shows the side panels 708 with one end 730 attached to the same vertical member 706 as the folding display panel 704. The other end 732 of the side panel 708 is about to be lowered and inserted into a channel 715 in a corresponding vertical member 706 wherein the attachment mechanism 716 can be lowered and secured into the channel 715 of the vertical member 706.

Figure 8A:
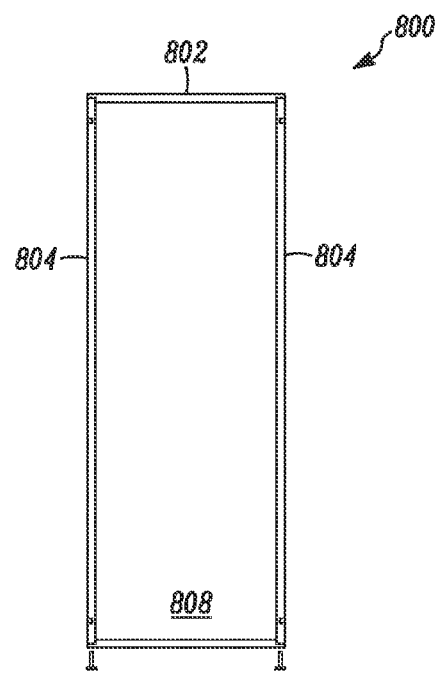
FIG. 8A depicts a middle frame assembly 800 of a display panel.

FIG. 8A depicts a middle frame assembly 800 of a display panel. The middle frame 800 may include a top cap 802, at least one rotating hinge 804 (discussed in more detail in FIG. 8B) and a display panel 808. The rotating hinges 804 may be secured to either side of the display panel 808. In the embodiment shown, the edges of a display panel 808 slide into a groove 803 (FIG. 8B) formed on an inside of each rotating hinge 804.

Figure 8B:
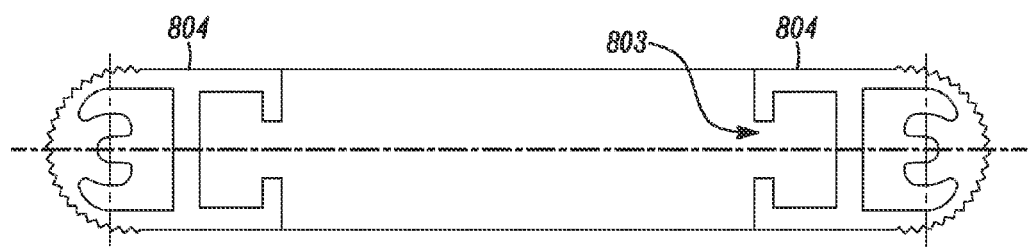
FIG. 8B depicts a top view cross section of a middle display panel.

FIG. 8B depicts a top view cross section of a middle display panel including rotating hinges 804. Each rotating hinge 804 allows adjacent display panels to be secured to one another while permitting the panels to rotate through a range of relative angles to one another. This may be used, for example, to accommodate angled arrangements of displays, or for folding of displays for shipping, storage, and the like.

Figure 8C:
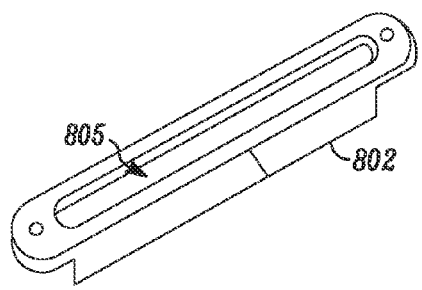
FIG. 8C is a perspective view of a top cap for a display panel.

FIG. 8C is a perspective view of a top cap 802 for a display panel. The top cap 802 may include a slot 805 or other opening through which the display panel 808 can be removably and replaceably inserted into the frame assembly 800. The display panel 808 may be supported within the assembly by gravity, or the display panel 808 may be secured within the assembly by the means of fasteners, such as screws, bolts or adhesives. In another aspect, the top cap 802 may not include any opening, and may be secured on the top of the display panel 808 after the display panel 808 is inserted into the grooves 803 of the rotating hinges 804.

Figure 9B:
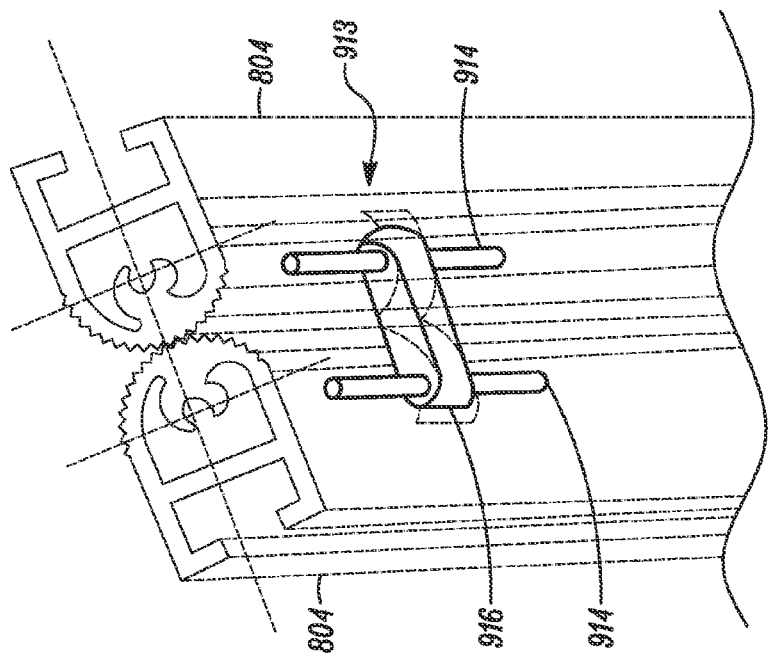
FIG. 9B is a perspective view of a rotating hinge.
Figure 9A:
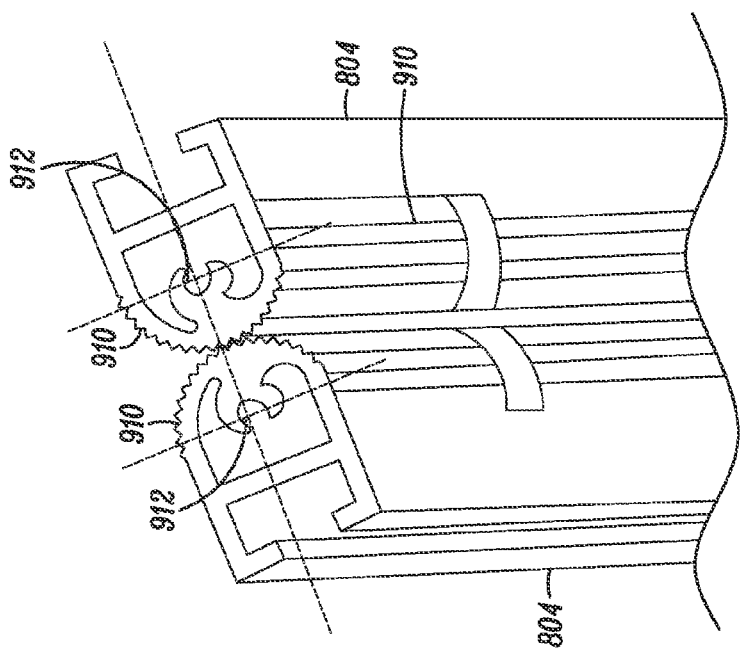
FIG. 9A is a perspective view of a rotating hinge.

FIG. 9A is a perspective view of a rotating hinge 804. The rotating hinge 804 may be formed with multiple grooves 910 at a predetermined points along a predetermined radius around a center point 912, which general shape may be formed in an extrusion or using any other suitable fabrication technique. By placing the grooves at a predetermined radius, the opposing sides of the hinge form a rolling contact joint that can be secured using a fastener spanning the corresponding center points 912. Thus it is possible to keep the center point 912 of two corresponding rotating hinges 804 at a constant distance regardless of the angle at which they are placed. It will be appreciated that the radius may also or instead be varied so that, for example, the rotating hinge 804 provides increasing resistance to angulation as the relative angle of two joined panels increases. It will be appreciated that the term "rotating hinge" as used herein may refer to one half of such a hinge—that is, the mechanical configuration of a panel edge that permits joined rotation—or to an assembled pair of such halves. It will further be appreciated that, while the rotating hinge described herein can be readily and conveniently fabricated by extrusion, other hinges are known in the art and may be suitably adapted to rotatably join display panels as contemplated herein.

FIG. 9B is a perspective view of a rotating hinge. As depicted in FIG. 9B, with a fixed relationship between centers, the two sides of the rotating hinge may be secured with a fastener 913 including two pins 914 and a bracket 916 that secures the pins within the extruded cross section of each side. With this arrangement, the opposing sides can also be maintained at a fixed distance relative to one another. It will be understood that more than one fastener 913 may be used to secure the two sides of the hinge, such as with a number of such fasteners and pins along the length of adjacent panels. In this manner, the panels may be hingeably and rotatably coupled to one another.

In addition, any suitable locking mechanism may be provided to secure a hinge at a desired angle. For example, a u-bracket or the like may be dropped over a top of the adjacent panels at the hinge in order to maintain two hingeably-coupled panels in a planar orientation, e.g., after unfolding for use, or in any other desired relative orientation. Similarly, a rod or the like may be inserted through a rigid top member of two adjacent panels to secure the desired relative orientation. More generally, any additional hardware, such as tools-free hardware, may be used to position hinged panels relative to one another for use in a tradeshow display.

FIGS. 10A-10C depict a left side frame assembly 1000 of the display panel. It will be understood that the right side frame assembly may in general be the mirror image of the left side frame assembly 1000. In some embodiments, a side frame assembly 1000 consists of an end frame 1020, which is attached to the vertical member by attachment mechanism 1022 (as discussed above), a display panel 1008, and a rotating hinge 1004. This embodiment allows for the side frame assembly to remain fixed with respect to the vertical member (e.g., on the left side of FIG. 10B) while allowing for a rotatable orientation with respect to an adjacent panel joined to the frame assembly 1000 on an opposing side (e.g., on the right side of FIG. 10B). The side frame assembly top cap 1024 may have either two rounded ends like the middle frame top cap 802 or a rounded end 1026 and a square end 1028. It will further be understood that a right side frame assembly may be provided having complementary features to join to a vertical member on its right side. The top cap 1024 may optionally include a slot to permit removal and replacement of display materials in the frame assembly 1000.

Figure 11:
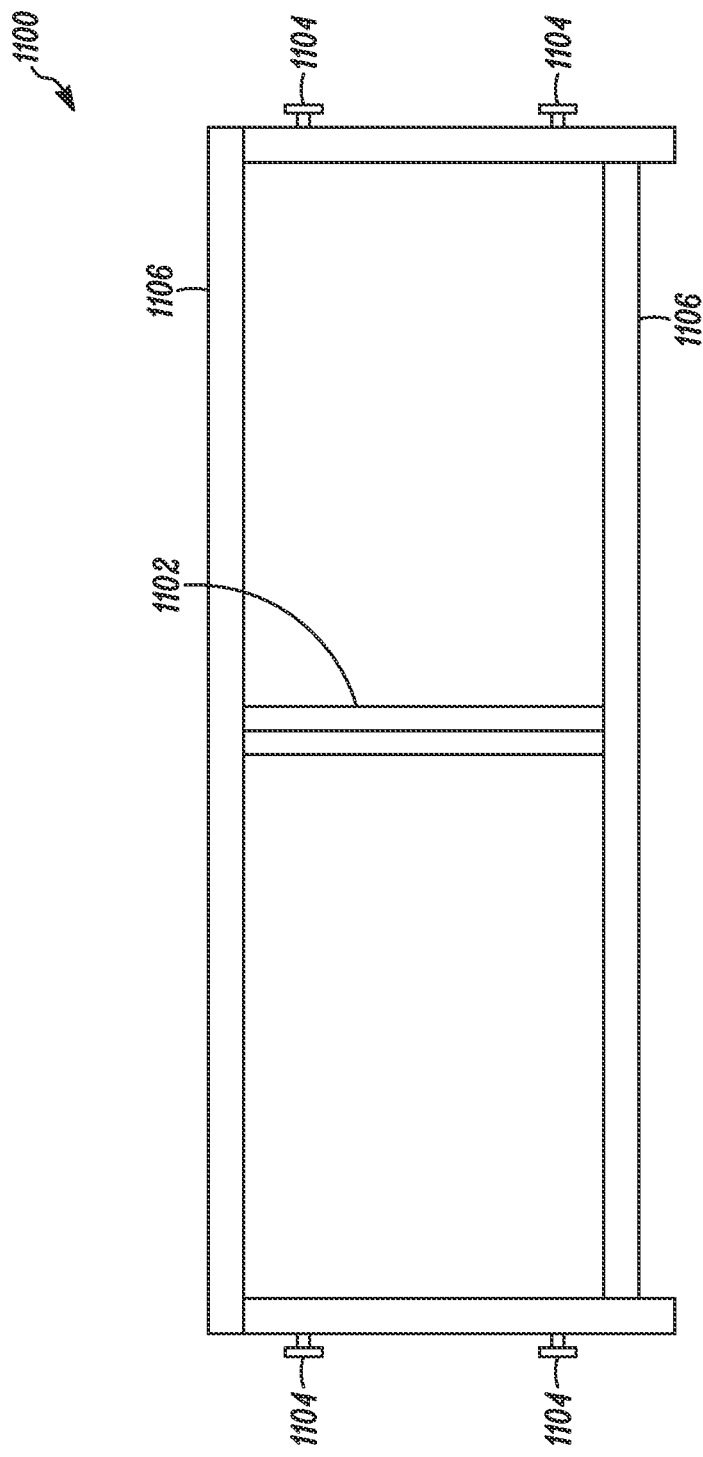
FIG. 11 depicts a display side panel.

FIG. 11 depicts a display side panel 1100. The display side panel 1100 may be assembled with either rotating hinges or fixed side rails 1102 (as shown). The sided panel 1100 may be connected to vertical members by one attachment mechanism 1104 (as discussed above with respect to the display panels) or with two attachment mechanisms 1104 per end (as shown). It will be understood that the display panels may also be attached using multiple attachment mechanisms per end. The side rail top caps 1106 may cover discrete sections of the side panel 1100 (as discussed above with respect to the display panels) or may run the length of the side panel (as shown). It will be understood that the display panels may also have top caps that run the entire length of the display panel, that is, across multiple separate panels with or without intervening vertical members. In addition, each top cap may have a slot as described above so that graphics panels or the like can be removably and replaceably inserted into the rigid frame of a panel in order to change or update graphics for a tradeshow display.

In some embodiments, the entire tradeshow display may be disassembled and all the panels and hardware associated may be laid flat and placed in a box for ease of shipment and storage.

While various embodiments have been disclosed, it will be apparent to those of ordinary skill in the art that many more embodiments and implementations are possible within the scope of the claims. Accordingly, the present application is not to be restricted except in light of the attached claims and their equivalents.

What is claimed is:

1. A system for tool-free assembly of a multi-part tradeshow display, the system comprising:
a pair of vertical members each having a channel of a first width and retaining flanges of a second width; and
a display panel surrounded by a rigid frame and an attachment mechanism consisting of a first attachment head on a first side of the rigid frame and a second attachment head on a second side of the rigid frame, wherein the first attachment head and the second attachment head each have a head with a diameter between the first width and the second width and a shaft having a diameter less than the second width, wherein the retaining flanges of each of the pair of vertical members separate from one another about an intermediate point along the length thereof to form an opening to receive one of the attachment heads, wherein the opening has parallel sides and an end shape that urges an attachment mechanism into a centered position in the channel as the attachment mechanism slides within the channel and axially along a corresponding one of the pair of vertical members.

2. The system of claim 1 wherein the display panel is constructed from a material which is selected or combined from the group consisting of corrugated paper, corrugated plastic, cloth, and acrylic.

3. The system of claim 1 wherein the rigid frame is formed from extruded aluminum members.

4. The system of claim 1 wherein each attachment mechanism include a bolt.

5. The system of claim 1 wherein the opening has a rounded bottom adjacent to the flanges to urge the attachment mechanism into the channel.

6. The system of claim 1 wherein each vertical member has a plurality of channels.

7. The system of claim 6 wherein each vertical member is rectangular and has one channel and at least one opening corresponding to each side.

8. The system of claim 6 wherein each vertical member has a plurality of sides and has one channel and at least one opening corresponding to each side.

9. The system of claim 1 wherein a plurality of the display panels are arranged to form a three-dimensional display.

10. A system for tool-free assembly of a multi-part trade show display, the system comprising:
a pair of vertical members each having a channel of a first width with retaining flanges of a second width less than the first width, the retaining flanges widening about an insertion point to provide an opening to receive an object into the channel, wherein the opening has parallel sides and an end shape that urges an attachment mechanism into a centered position in the channel as the attachment mechanism slides within the channel and axially along a corresponding one of the pair of vertical members; and
a display panel surrounded by a rigid frame and an attachment mechanism consisting of a first pair of attachment heads on a first side of the rigid frame and a second pair of attachment heads on a second side of the rigid frame, wherein each head of the first pair of attachment heads and the second pair of attachment heads has a diameter between the first width and the second width and a shaft having a diameter less than the second width.

11. The system of claim 10 wherein the display panel is constructed from a material which is selected or combined from the group consisting of corrugated paper, corrugated plastic, cloth, and acrylic.

12. The system of claim 10 wherein the rigid frame is formed from extruded aluminum members.

13. The system of claim 10 wherein each attachment mechanism include a bolt.

14. The system of claim 10 wherein the opening has a rounded bottom adjacent to the flanges to urge the attachment mechanism into the channel.

15. The system of claim 10 wherein each vertical member has a plurality of channels.

16. The system of claim 15 wherein each vertical member is rectangular and has one channel and at least one opening corresponding to each side.

17. The system of claim 15 wherein each vertical member has a plurality of sides and has one channel and at least one opening corresponding to each side.

18. The system of claim 10 wherein a plurality of the display panels are arranged to form a three-dimensional display.

* * * * *